Sept. 13, 1966  C. E. SHINN  3,272,626
XEROGRAPHIC METHOD
Filed Feb. 23, 1962
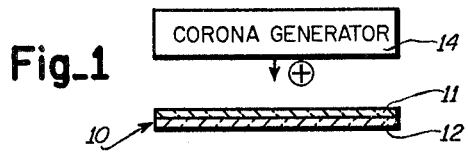
Fig_1
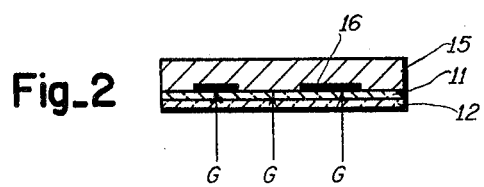
Fig_2
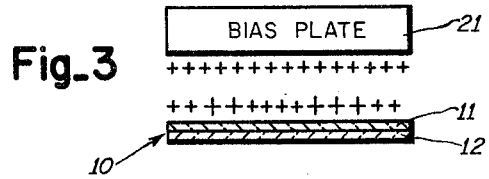
Fig_3
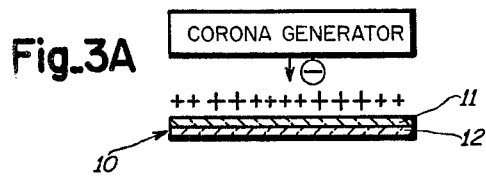
Fig_3A
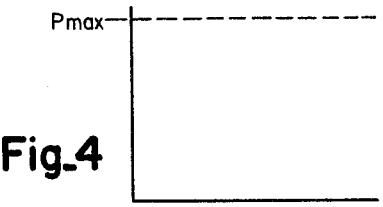
Fig_4
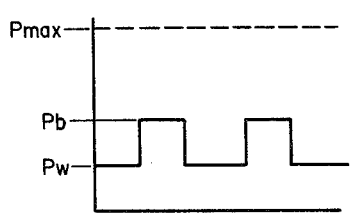
Fig_5
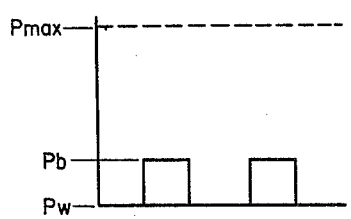
Fig_6
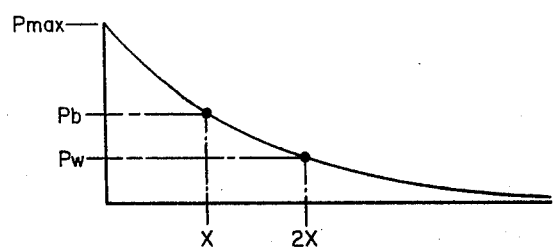
Fig_7A
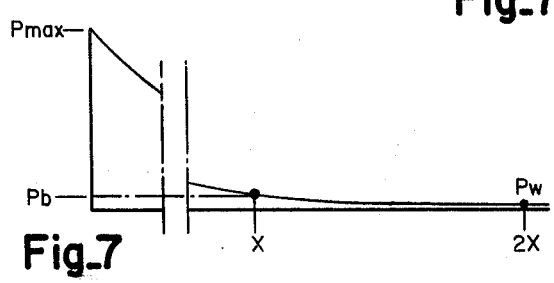
Fig_7
INVENTOR
CHARLES E. SHINN
BY Thomas S. Ross
Joseph R. Spalla
ATTORNEYS

United States Patent Office 3,272,626
Patented Sept. 13, 1966

3,272,626
XEROGRAPHIC METHOD
Charles E. Shinn, Simsbury, Conn., assignor, by mesne assignments, to Royal Typewriter Company, Inc., New York, N.Y., a corporation of Delaware
Filed Feb. 23, 1962, Ser. No. 175,204
1 Claim. (Cl. 96—1)

This invention relates to the art of xerography; more particularly it relates to a method for producing a latent electrostatic image on a radiation transparent or translucent xerographic sheet or plate, of indicia carried by a nontransparent member superposed on said xerographic plate; and specifically it relates to a method wherein radiation is directed through said xerographic plate to said indicia carrying member, the indicia bearing surfaces of which absorb said radiation and the reflective surfaces of which return said radiation back through said xerographic plate, the double passage of radiation through said xerographic plate effecting a greater discharge thereof than radiation passing through once.

The method of copying indicia on nontransparent carriers has heretofore involved the illumination of the carrier and the transmission of the light from the differentially reflective areas through a lens system onto a charged xerographic plate. In that a lens system is necessary the cost of the equipment is increased. Further a relatively large and bulky housing must be provided to support not only the lens but also the image material to be copied and the xerographic plate on opposite sides of and predetermined distances from the lens system depending on the focal length of the lens system.

In accordance with the present invention there is provided a reflex method of selectively discharging a xerographic plate or sheet in accordance with indicia on a nontransparent sheet without the necessity for any lens system. In accordance with the present invention an indicia carrying nontransparent sheet is superposed on a radiation transparent xerographic plate or sheet which has been previously sensitized or charged. The superposed assembly is exposed to radiation from the transparent xerographic plate side. The radiation in passing through the plate partially discharges the sensitized surface and upon striking the indicia bearing sheet is absorbed by indicia bearing surfaces and reflected from nonindicia bearing surfaces. The reflected radiation discharges the sensitized plate further such that areas on the plate corresponding to light absorbing areas on the indicia bearing sheet carry a higher residual charge than those areas corresponding to the light reflecting areas.

In accordance with the invention the radiation intensity and/or the time over which the xerographic plate is exposed to radiation is controlled so that the difference between the charge levels on the plate after exposure is optimized. Since the lower charge level resulting from optimization will be capable of capturing developer powders, the differentially charged plate is biased to reduce the charge levels to the point such that the lower charge level is reduced substantialy to zero, whereby when the plate is developed, only the areas of higher charge level corresponding to indicia will capture the developer powder. The developing and fixing of the captured powder may be accomplished in any of several conventional manners as will hereinafter appear.

An object of the invention is in the provision of a reflex xerographic method.

Another object of the invention is in the provision of a method for creating a latent electrostatic image on a xerographic plate which image corresponds to indicia on a nontransparent sheet without the employment of a lens system.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURES 1–3 and 3a are exaggerated views schematically illustrating the steps involved in the method of the present invention;

FIGURES 4–6 are views showing the charge patterns on the xerographic plate corresponding respectively to FIGURES 1–3; and FIGURES 7 and 7a are views showing typical discharge curves of a photoconductive material.

Referring now to the drawings there is shown in FIGURE 1 a xerographic plate generally designated 10, which may comprise a chargeable plate comprising a photoconductive insulating layer 11 on an insulating backing member or alternatively, as shown, a photoconductive insulating layer 11 overlying a conductive backing member 12. The photoconductive layer 11, of which many are known to the art, is deposited on the backing member by techniques known to the art in a thin film whose thickness may be on the order of microns such that it is substantially transparent to radiation. The conductive backing member whose thickness may be on the order of thousandths of an inch may be a conductive glass, plastic, or other transparent conductive material, or a transparent glass or other supporting plate on which is deposited a film of a transparent conductive material, such as NESA, marketed by the Pittsburgh Plate Glass Company.

The xerographic plate 10 shown in FIGURE 1 is uniformly charged either positive (FIGURE 4) or negative to several hundred volts by a corona discharge generator 14 as illustrated in FIGURE 1 as will be understood by those skilled in the art.

As shown in FIGURE 2 a nontransparent original 15 having indicia 16 thereon is placed superposed on the xerographic plate with the indicia bearing surface thereof optically separated either from the surface of the photoconductive insulating layer as shown, or from the surface of the backing member. By optical separation it is meant a separation between the two surfaces or a contact of the surfaces with one another, which does not impair the passage of reflected radiation through the xerographic plate. The original therefore may be in contact with the photoconductive layer where its resistivity is of a high order such that it will not discharge the photoconductive layer 11 or may be separated from the photoconductive layer by a thin transparent insulating layer (not shown).

As illustrated in FIGURE 2 the superposed plate 10 and original 15 are then exposed to radiation, preferably in the visible region. The radiation G, shown by arrows, is directed toward the indicia bearing surface of the original through the xerographic plate. The radiation passing through the xerographic plate is absorbed by the indicia bearing areas 16, while the radiation passing through the plate opposite clear areas of the original is diffusely reflected back through the xerographic plate. Inasmuch as the thickness of the photoconductive layer may be on the order of microns the diffusely reflected radiation has no opportunity to spread and is therefore only locally effective.

In that the resistivity of a photoconductive material decreases in relation to the amount of radiation passing therethrough, the charge potential on the surface of the xerographic plate 10 will decrease accordingly, dissipating through the photoconductive material to the conducting layer 12. The areas on the xerographic plate opposite clear areas of the original therefore will be discharged to a greater degree than those areas opposite indicia bearing areas as pictorially illustrated in FIGURES 3 and 3A.

The inverse relationship between charge potential and radiation exposure, i.e. the discharge curve equation, is graphically illustrated by the exemplary curves in FIGURES 7 and 7a as an exponential relationship whose equation is $P=P_{max}e^{-x}$, where $P_{max}$ is the original potential to which the xerographic plate is charged, and $x$ is the amount of radiation to which the plate is exposed. With reference to FIGURE 7 it is apparent that the radiation intensity and/or the period over which radiation is applied can be pretermined such that the substantially double exposure to radiation of the charged plate opposite clear areas discharges it to an approximately zero charge or white level, designated $P_W$, and the single exposure to radiation of the charged plate opposite indicia bearing areas to some intermediate charge level, designated $P_b$. As is evident from FIGURE 7 the difference between the intermediate charge level $P_b$ corresponding to indicia and the essentially zero charge level $P_W$, will not be sufficient to provide good contrast i.e. the finished copy will be a light gray on a white background.

In accordance with the invention therefore the exposure time is predetermined such that discharge resulting from single and double exposure of the xerographic plate to direct and to direct and reflected radiation respectively is confined to that region of the discharge curve (FIGURE 7a) which will produce the optimum difference in charge levels. Assuming the exemplary exponential relationship shown, the optimum region, as determined by differentiating the difference between charge levels corresponding to single exposure $x$ and double exposure $2x$, is between one half the original charge potential and approximately one quarter the original charge potential respectively, as shown in FIGURES 5 and 7a. An approximation is given inasmuch as the reflected radiation will be somewhat less than the direct radiation due to radiation absorption.

Developing the latent image illustratively as shown in FIGURES 5 and 7a will result in dark indicia on relatively gray background areas. Hence in order to render the charge areas corresponding to white areas on the original copy appear white when the xerographic plate is developed, the plate may be biased as shown in FIGURE 3 by bringing a positively charged plate 21 adjacent the now selectively discharged xerographic plate. The charge potential on the bias plate is equivalent to $\frac{1}{4}P_{max}$ such that the areas on the xerographic plate charged to $\frac{1}{4}P_{max}$ will be neutralized and the areas charged to $\frac{1}{2}P_{max}$ will be reduced to $\frac{1}{4}P_{max}$ as shown in FIGURE 6. If a suitable powder is now introduced between the bias and xerographic plate it will adhere only to those areas on the xerographic plate having a relative charge potential of $\frac{1}{4}P_{max}$. Thereafter the powder may be fixed on the xerographic plate 10, or transferred to another sheet and fixed if a direct reproduction is desired, all in conventional fashion.

Alternatively the areas on the xerographic plate corresponding to white areas may be reduced to zero potential and those corresponding to black areas to $\frac{1}{4}P_{max}$ by subjecting the xerographic plate to a negative corona discharge where the original plate charge is positive as shown in FIGURE 3A with the resulting charge potentials shown in FIGURE 6. Again the image may be developed in the same conventional fashion as explained above.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

A method of xerography comprising the steps of superposing a radiation transparent charged xerographic plate with a non-transparent original to be reproduced with the indicia side of said original in optical contact with the unitary layer of photoconductive insulating material comprising said plate, said charged plate being characterized by a charge potential-radiation exposure curve wherein as the amount of radiation directed therethrough increases, the charge potential on said plate decreases exponentially, directing visible radiation through said plate to said indicia side of said original whereby clear areas on said original will reflect said radiation and indicia bearing areas will absorb said radiation, said reflected radiation in passing back through said plate causing a greater discharge of said plate areas opposite clear areas on said original, setting the radiation exposure to confine the resulting discharge to the slope region of said exposure curve which will produce a maximum difference between the charge levels on said plate corresponding to indicia bearing and clear areas, and thereafter subjecting said plate to a bias field of the same polarity and equal in intensity to that of the field intensity of the plate areas corresponding to clear areas such that the resulting ability of plate areas corresponding to clear areas on said original to attract and retain charged powder is eliminated.

References Cited by the Examiner

UNITED STATES PATENTS

| | | | |
|---|---|---|---|
| 2,708,626 | 5/1955 | Yule et al. | 96—45 |
| 2,877,132 | 3/1959 | Mathews | 117—17.5 |
| 2,917,385 | 12/1959 | Byrne | 96—1 |
| 2,955,938 | 10/1960 | Steinhilper | 96—1 |
| 2,956,874 | 10/1960 | Giaimo | 96—1 |
| 2,979,403 | 4/1961 | Giaimo | 117—17.5 |
| 3,037,861 | 6/1962 | Hoegel et al. | 96—1 |
| 3,102,026 | 8/1963 | Metcalfe et al. | 96—47 |
| 3,117,884 | 1/1964 | Greig | 117—17.5 |

OTHER REFERENCES

Bickmore et al.: Photographic Sci. and Eng., vol. 3, No. 5, September 1959, pp. 210–214 relied on.

NORMAN G. TORCHIN, *Primary Examiner.*

A. L. LIBERMAN, D. D. PRICE, *Assistant Examiners.*